United States Patent [19]

Lundström

[11] Patent Number: 5,358,455
[45] Date of Patent: Oct. 25, 1994

[54] DEVICE FOR TRANSMITTING TORQUE BETWEEN TWO ROTATABLE SHAFTS

[75] Inventor: Bo Lundström, Glumslöv, Sweden
[73] Assignee: Ipumatic AB, Sweden
[21] Appl. No.: 44,626
[22] Filed: Apr. 9, 1993

[30] Foreign Application Priority Data

May 19, 1992 [SE] Sweden ............... 9201564-3

[51] Int. Cl.⁵ ............................................. F16H 1/44
[52] U.S. Cl. ............................... 475/101; 475/127; 475/136
[58] Field of Search ............... 475/116, 127, 136, 101

[56] References Cited

U.S. PATENT DOCUMENTS

| | | | |
|---|---|---|---|
| 2,877,668 | 3/1959 | Kelbel | 475/127 |
| 3,930,423 | 1/1976 | Craig | 475/116 |
| 4,713,984 | 12/1987 | Ohkubo | 475/127 |
| 4,909,371 | 3/1990 | Okamoto et al. | 192/103 F |

FOREIGN PATENT DOCUMENTS

| | | | |
|---|---|---|---|
| 157542 | 7/1991 | Japan | 475/127 |
| 181620 | 8/1991 | Japan | 475/127 |
| 64724 | 2/1992 | Japan | 475/127 |
| 69414 | 3/1992 | Japan | 475/127 |

Primary Examiner—John T. Kwon
Attorney, Agent, or Firm—Laurence R. Brown

[57] ABSTRACT

A device for transmitting torque between two rotatable shaft members (2, 3) in a stationary housing (1) contains a number of alternate clutch discs (10, 11) engageable to counteract differential rotational speed between the two shaft members, to which they are connected, a hydraulic clutch piston (12) to engage the clutch discs and a hydraulic pump arrangement (13-22) driven by the speed differential between the two shaft members. An externally controllable pressure-reducing valve (25-27) is provided in the hydraulic connection from the clutch piston to the low pressure side of the pump arrangement, whose high pressure side is connected to the clutch piston.

7 Claims, 2 Drawing Sheets

DEVICE FOR TRANSMITTING TORQUE BETWEEN TWO ROTATABLE SHAFTS

TECHNICAL FIELD

This invention relates to a device for transmitting torque between two rotatable, generally axially aligned shafts, the device containing in a stationary housing two rotatable shaft members for connection to said shafts, a number of alternate clutch discs connected to the two shaft members and engageable to counteract differential rotational speed between the shaft members, at least one hydraulic clutch piston to engage the clutch discs, and a hydraulic pump arrangement driven by the speed differential between the two shaft members, the high-pressure side of the pump arrangement being connected to the clutch piston and a restriction being provided in the hydraulic connection from the clutch piston back to the low-pressure side of the pump arrangement.

TECHNICAL BACKGROUND

A device of the kind described above is known through U.S. Pat. No. 3,987,689, where the two shafts are the output shafts of a vehicle differential mechanism. The device may accordingly in this case be called a differential brake. There may, however, be other instances when it is desired to counteract a certain rotational speed differential between two shafts, a typical example being the two shafts to the driven front and the rear axle, respectively, of a four-wheel-drive vehicle.

Whereas the above-mentioned patent publication shows a "speed-sensitive differential mechanism" and the present invention is applied to the more general case with two axially aligned shafts, the same general considerations apply.

Although U.S. Pat. No. 3,987,689 represents the closest known prior art, there are other publications suggesting neighbouring solutions to the problem of decreasing undesired rotational speed differential between two shafts, such as EP-A-0 350 044, U.S. Pat. No. 4,012,968, U.S. Pat. No. 3,488,980 and U.S. Pat. No. 5,087,228.

Returning to U.S. Pat. No. 3,987,689, the device shown therein has radial pistons driven by a circumferential cam on an actuator or ring-shaped piston. The hydraulic pressure created by the radial pistons is conveyed to the actuator for engaging a clutch and is discharged through a restricted bore (in the actuator).

This is a relatively simple design with advantages. However, its operating characteristics are built into the construction and may not easily be changed, especially not during use.

There is presently an increasing demand for having full control over different parameters or characteristics in a device of this kind. For example, an anti-lock system for vehicle brakes cannot work properly together with an uncontrolled differential brake. Under other working conditions it may be desirable to modify the torque transmission between the two shafts in question.

In other words it may be desirable to limit the torque transmitted between the two shafts for longer or shorter times to a lower level than what is motivated by the rotational speed differential between the shafts.

The Invention

This may according to the invention be attained in that the restriction in the hydraulic connection from the clutch piston back to the low-pressure side of the pump arrangement is an externally controllable pressure-reducing valve or throttle valve.

Preferably this valve comprises an axially movable valve body having a frusto-conical part at a step in the bore for the valve body.

The pressure-reducing valve is preferably controlled by the force of an electric solenoid on a core of the valve. In this way the control of the device may be integrated in an electric (or rather electronic) control system of a modern vehicle.

However, it is equally possible to control the pressure-reducing valve mechanically or hydraulically.

In a first embodiment of the invention, where the hydraulic pump arrangement comprises axially movable control pistons arranged in a first rotatable shaft member and cooperating with a swash plate on the second shaft member, the valve body may be arranged in the first shaft member and the core and the solenoid in the housing; the connection between the core and the valve body may here be provided by means of a fork and a bearing on an axially movable valve sleeve rotatable with the first shaft member.

In a second embodiment of the invention the clutch piston and the pistons of the hydraulic pump arrangement are provided in the housing, whereas the radially movable pump pistons cooperate with external cams on a control sleeve of a planetary gear arrangement between the housing and the two shaft members, which planetary gear arrangement imparts rotation to the control sleeve proportional to the differential rotational speed between the two shaft members. Here the pressure-reducing valve may be arranged in the housing, and the valve body is integral with the core of the solenoid.

BRIEF DESCRIPTION OF THE DRAWINGS

The invention will be described in further detail below under reference to the accompanying drawings, in which

FIG. 1 is a cross-sectional view of a first embodiment.

FIG. 2 is a cross-sectional view of a second embodiment.

DESCRIPTION OF TWO EMBODIMENTS

Figure 1:
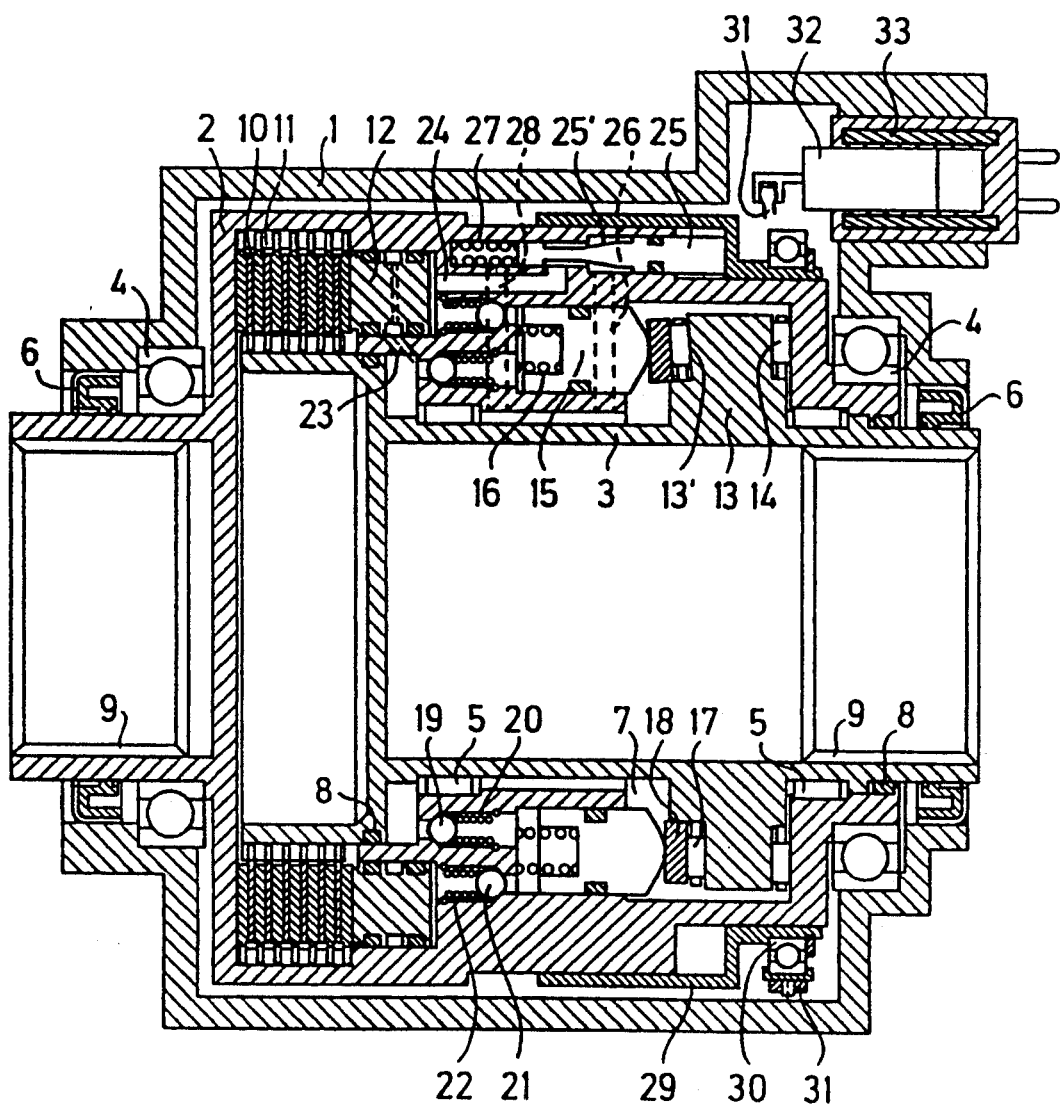
FIGS. 1 and 2 are cross-sectional views of two embodiments of the invention.

Reference is first made to FIG. 1. In a stationary housing 1 two shaft members 2 and 3 are rotatably journalled by means of radial bearings 4. The right shaft member 3 extends into the left shaft member 2, and in the shown case there are two bearings 5 between them. Sealings 6 are provided between the housing 1 and the respective shaft members 2 and 3. As will be more apparent below, an oil reservoir 7 is formed between the two shaft members 2 and 3; two further sealings 8 are provided at either side of this oil reservoir 7.

The two shaft members 2 and 3 are to be connected to two shafts (not shown); only an internal spline 9 in each shaft member is indicated for this purpose. The internal journalling and arrangement is such that no relative axial movements will occur or be permitted between the two shaft members 2 and 3.

A number of alternate clutch discs or rings 10 and 11 are splined to the left shaft member 2 and the right shaft member 3, respectively, to counteract—when engaged—differential rotational speed between the two shaft members. The stack of clutch discs will be referred to as the clutch 10, 11 below.

The clutch 10, 11 can be activated to clutch the two shaft members 2 and 3 together by means of a ring-shaped clutch piston 12, axially movable in the left shaft member 2. If this clutch piston 12 is pushed to the left in the drawing in a way to be described, the clutch 10, 11 will be engaged, but otherwise free relative rotation between the shaft members 2 and 3 is permitted. The clutch piston 12 is sealed in its ring-shaped cylinder.

The shaft member 3 is provided with a radial control flange 13, which to the right has an axial bearing 14 against a corresponding radial wall of the left shaft member 2. To the left in the drawing the flange 13 is provided with a control surface 13' forming a certain angle with the normal to the axle of the arrangement; the control flange 13 may accordingly be characterized as a swash plate.

A certain number of circumferentially distributed control pistons 15 are axially movably arranged in the left shaft member 2. Each control piston 15 is sealed relative to its bore and is biassed towards the swash plate 13 by a compression spring 16. There is an axial bearing 17 and a ring 18 between the swash plate 13 and the control pistons 15.

If the two shaft members 2 and 3 rotate with exactly the same rotational speed in the housing 1, all the control pistons 15 will be stationary. If on the other hand there is a rotational speed differential between these two shaft members 2 and 3, the control pistons 15 will move axially back and forth due to their engagement with the swash plate 13. The frequency of this axial movement of course depends on the speed differential between the two shaft members 2 and 3.

As has already been mentioned, a space between the two shaft members 2 and 3 contains oil in a formed oil reservoir 7, in which the control pistons 15 move. This means that no external supply of oil is needed and that the arrangement is self-contained in this respect.

From the reservoir 7 oil is sucked into the compartment behind each control piston 15 (a low-pressure part of the system) via a non-return valve (for example in the form of a spring biassed ball 19) in a channel 20. Pressurized oil is transferred to the clutch piston 12 via a non-return valve (in the form of a spring biassed ball 21) in a channel 22. High-pressure oil leaking past the sealing of the clutch piston 12 may be returned to the oil reservoir 7 via a channel 23.

Accordingly, the clutch piston 12 will be activated to move to the left to engage the clutch 10, 11 at a relative rotational movement between the two shaft members 2 and 3. The pressure exerted on the clutch piston 12 not only depends on the inlet pressure in the channels 22 from the control pistons 15 but also the pressure in an outlet channel 24 from the clutch piston 12. This outlet channel 24 leads to a pressure reducing valve or throttle valve now to be described.

A throttle valve body 25 is axially movable in a bore in the left shaft member 2. This valve body 25 has a frusto-conical part 25' at a step in the bore, so that the position of the valve body in relation to this step will determine the flow of oil from the outlet channel 24 past the frusto-conical valve body part 25' to a low-pressure channel 26 leading back to the oil reservoir 7.

The throttle valve body 25 is biassed to the right in the drawing by means of a compression spring 27, and any oil leaking into the compartment at this spring is returned to the oil reservoir 7 by a channel 28. In the opposite direction the valve body 25 is biassed by an axially movable valve sleeve 29, which is non-rotatably arranged on the left shaft member 2 and accordingly rotating in relation to the housing 1. This sleeve 29 is provided with a radial ball bearing 30, with the outer race of which a fork mechanism 31 can cooperate for axial displacement of the sleeve 29. The fork mechanism 31 is connected to a core 32 of a solenoid 33 controlled by an external electric signal, so that the position of the core 32 determines the position of the valve body 25 in its bore.

Concluding: a rotational speed differential between the two shaft members 2 and 3 results in a hydraulic pressure increase on the clutch piston 12, activating the clutch 10, 11 and decreasing the speed differential with a certain torque. This torque is in principle proportional to the speed differential and can be controlled by the throttle valve 25.

Figure 2:
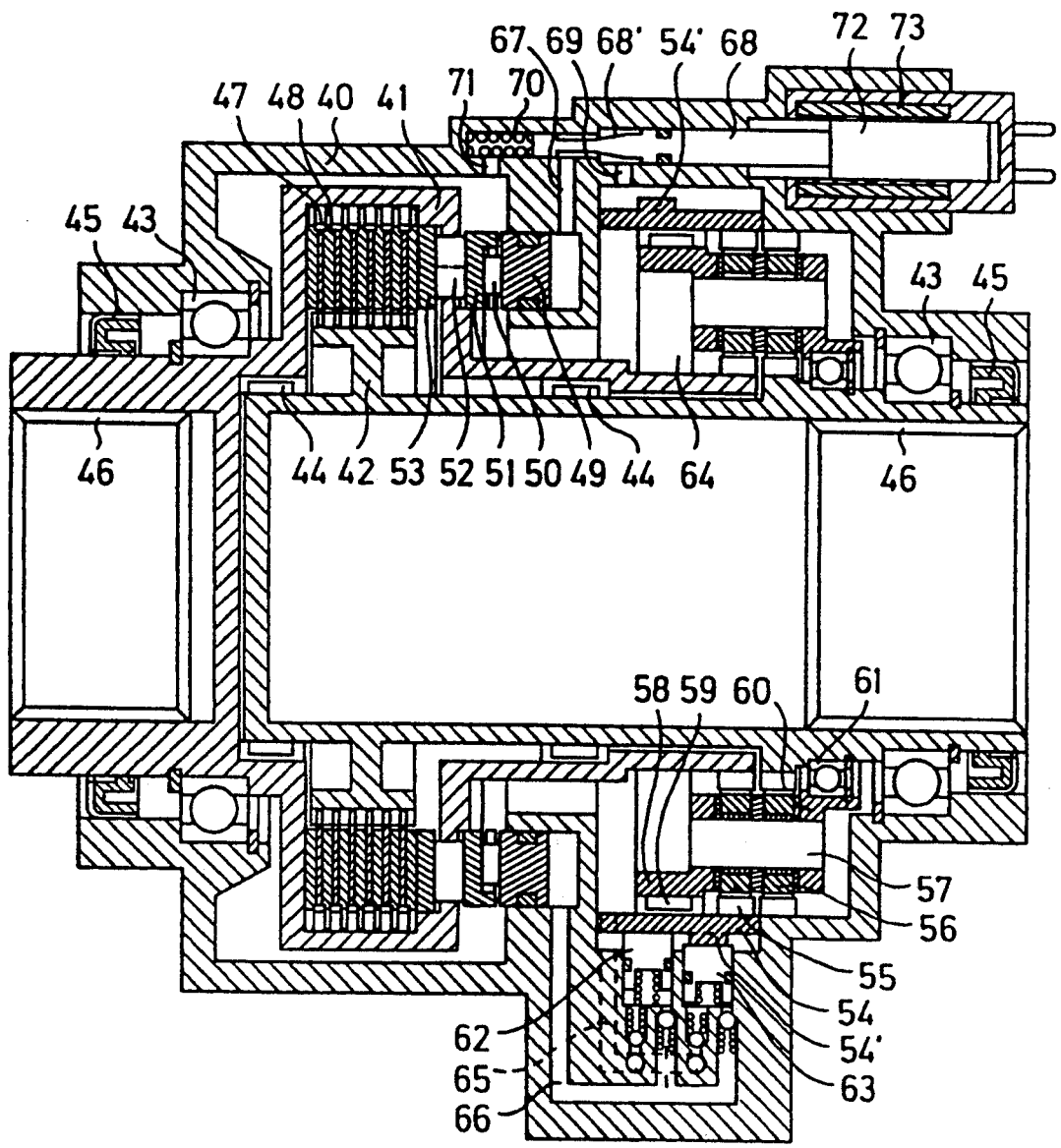

Reference is now made to FIG. 2 showing a second embodiment. In a stationary housing 40 two shaft members 41 and 42 are rotatably journalled by means of radial bearings 43. The right shaft member 42 extends into the left shaft member 41, and two bearings 44 are arranged between them. Sealings 45 are provided between the housing 40 and the respective shaft members 41 and 42.

The two shaft members 41 and 42 are to be connected to two shafts (not shown); only an internal spline 46 in each shaft member is indicated for this purpose. The internal journalling and arrangement is such that no relative axial movements will occur or be permitted between the two shaft members 41 and 42.

A number of alternate clutch discs or rings 47 and 48 are splined to the left shaft member 41 and the right shaft member 42, respectively, to counteract—when engaged—differential rotational speed between the two shaft members. The stack of clutch discs will be referred to as the clutch 47, 48 below.

The clutch 47, 48 can be activated to clutch the two shaft members 41 and 42 together by means of a ring-shaped clutch piston 49, which is axially movable in the housing 40. Due to the fact that this piston 49 is arranged in the stationary housing 40 and the clutch 47, 48 which it is to engage is rotatable, a special transmission arrangement is required. This arrangement may as shown consist of (in order from the piston 49) an axial bearing 50, a ring 51, a number of plungers 52 in the left shaft member 41, and a ring 53 against the clutch 47, 48. If the clutch piston 49 is pushed to the left in the drawing in a way to be described, the clutch 47, 48 will be engaged via the transmission arrangement 50-53, but otherwise free relative rotation between the shaft members 41 and 42 is permitted. The clutch piston 49 is sealed in its ring-shaped cylinder.

A planetary gear arrangement (to be described) between the housing 40 and the two shaft members 41 and 42 is used to impart rotation to a control sleeve 54 proportional to the differential rotational speed between the two shaft members 41 and 42.

One set of circumferentially distributed planet wheels 55 is arranged between an outer gear ring on the left shaft member 41 and an inner gear ring in the control sleeve 54, whereas a second set of circumferentially distributed planet wheels 56 is arranged between an outer gear ring on the right shaft member 42 and an inner gear ring in the stationary housing 40. Each pair of these planet wheels 55 and 56 is arranged on a common planet shaft 57 mounted between a left shaft support 58, which is rotatable relative to the control sleeve 54 over a radial bearing 59, and a right shaft support 60, which is rotatable relative to the right shaft member 42 over a radial bearing 61.

Two control pistons 62 and 63 are axially movably arranged in bores in the housing 40 radially outside the control sleeve 54 and are spring biassed in contact therewith. Due to the fact that the sleeve 54 is provided with external cams 54′, the control pistons 62 and 63 will be given a reciprocal or pumping movement at rotation of the control sleeve 54, which occurs at differential rotational speed between the two shaft members 41 and 42. The control pistons 62 and 63 are sealed in their respective bores.

The whole space between the housing 40 and the two shaft members 41 and 42 acts as a low-pressure oil reservoir 64. At reciprocal movements of the control pistons 62 and 63 oil is sucked through a channel 65 past a non-return valve into the compartment behind each control piston. Pressurized oil is then transferred to the clutch piston 49 past a non-return valve in a channel 66.

Accordingly, the clutch piston 49 will be activated to move to the left to engage the clutch 47, 48 at a relative rotational movement between the two shaft members 41 and 42. The pressure exerted on the clutch piston 49 not only depends on the inlet pressure in the channel 66 from the control pistons 62 and but also the pressure in an outlet channel 67, which leads to a pressure reducing valve or throttle valve.

A throttle valve body 68 is axially movable in a bore in the housing 40. This valve body 68 has a frusto-conical part 68′ at a step in the bore, so that the position of the valve body in relation to this step will determine the flow of oil from the outlet channel 67 past the frusto-conical valve body part 68′ to a low-pressure channel 69 leading back to the oil reservoir 64.

The throttle valve body 68 is biassed to the right in the drawing by means of a compression spring 70, and any oil leaking into the compartment at this spring is returned to the oil reservoir 64 by a channel 71. At its right hand end the valve body 68 is connected to a core 72 of a solenoid 73 controlled by an external electric signal.

Concluding: a rotational speed differential between the two shaft members 41 and 42 results in a hydraulic pressure increase on the clutch piston 49, activating the clutch 47, 48 and decreasing the speed differential with a certain torque. This torque is in principle proportional to the speed differential and can be controlled by the throttle valve 25.

Having now described the two embodiments shown in FIGS. 1 and 2, it is important to note that modifications are possible.

For example, in both these two embodiments the pressure-reducing valve is electrically controlled by means of a solenoid with a core connected to the valve body. However, it would be equally possible to control the valve body mechanically or hydraulically. No such solutions are depicted, but a person skilled in the art would have no difficulties in finding such solutions, when the two electrically controlled embodiments are known.

Also, as an alternative to the pressure-reducing valve employed in the two embodiments, it would be possible to use any known such valve, for example a slide valve.

In the first embodiment according to FIG. 1 the clutch piston 12 is stated to be one ring-shaped piston. Alternatively, it would be possible to have a number of circumferentially distributed clutch pistons. The same is true for the second embodiment according to FIG. 2, where a number of circumferentially distributed clutch pistons could be provided instead of the single, ring-shaped clutch piston 49.

In the embodiment according to FIG. 2 the hydraulic pump arrangement comprises pistons in the stationary housing and a control sleeve, which rotates at a rotational speed differential between the two shaft members of the device. Another possibility—within the concept with the planetary gear arrangement—is to arrange one part of the pump and the clutch discs in the stationary housing, whereas the other part of the pump rotates at a rotational speed differential between the two shaft members.

In the FIG. 1 embodiment use is made of an axial piston pump and in the FIG. 2 embodiment of a radial piston pump for generating the hydraulic pressure. A further possibility is to use a so called gerotor pump or gear-within-gear pump, such as for example shown in U.S. Pat. No. 4,012,968.

The shown planetary gear arrangement is only one example; other possibilities are evident for any person skilled in the art.

Summarizing, the device according to the invention is based on the concept that when there is a rotational speed differential between the two shafts or shaft members, the hydraulic pump arrangement creates a hydraulic pressure, proportional to the differential. This pressure is used to activate the clutch, so that torque is transmitted between the shafts, resulting in a decreased speed differential. The hydraulic pressure is decreased over a restriction, which is externally controllable for obtaining control over the characteristics of the device depending on the circumstances.

What is claimed is:

1. A device for transmitting torque between two rotatable, generally axially aligned shafts, the device containing in a stationary housing (1; 40) two rotatable shaft members (2, 3; 41, 42) for connection to said shafts, a number of alternate clutch discs (10, 11; 47, 48) connected to the two shaft members and engageable to counteract differential rotational speed between the shaft members, at least one hydraulic clutch piston (12; 49) to engage the clutch discs, and a hydraulic pump arrangement (13–22; 54–63) driven by the speed differential between the two shaft members, the high-pressure side of the pump arrangement being connected to the clutch piston and a restriction (25–27; 68–70) being provided in the hydraulic connection from the clutch piston back to the low-pressure side of the pump arrangement, wherein the restriction is an externally controllable pressure-reducing valve (25–27; 68–70).

2. A device according to claim 1, wherein the pressure-reducing valve (25–27; 68–70) comprises an axially movable valve body (25; 68) having a frusto-conical part (25′; 68′) at a step in the bore for the valve body.

3. A device according to claim 1 wherein the pressure-reducing valve (25–27; 68–70) is controlled by the force of an electric solenoid (33; 73) on a core (32; 72) of the valve.

4. A device according to claim 1, wherein the pressure-reducing valve is controlled by a mechanical force.

5. A device according to claim 1, wherein the pressure-reducing valve is controlled by a hydraulic force.

6. A device according to claim 3, in which the hydraulic pump arrangement comprises axially movable control pistons (15) arranged in a first rotatable shaft member (2) and cooperating with a swash plate (13) on the second shaft member (3), wherein the valve body

(25) is arranged in the first shaft member and the core (32) and the solenoid (33) in the housing (1), the connection between the core and the valve body being provided by means of a fork (31) and a bearing (30) on an axially movable valve sleeve (29) rotatable with the first shaft member (2).

7. A device according to claim 3, in which the clutch piston (49) and the pistons (62, 63) of the hydraulic pump arrangement (54–63) are provided in the housing (40), the radially movable pump pistons (62, 63) cooperating with external cams (54') on a control sleeve (54) of a planetary gear arrangement (54–61) between the housing (40) and the two shaft members (41, 42), which planetary gear arrangement imparts rotation to the control sleeve proportional to the differential rotational speed between the two shaft members (41, 42), wherein the pressure-reducing valve (68–70) is arranged in the housing (40) and that the valve body (68) is integral with the core (72) of the solenoid (73).

* * * * *